Nov. 11, 1952     C. M. McCORMICK     2,617,368
VEHICLE ELEVATING APPARATUS
Filed Feb. 7, 1949     3 Sheets-Sheet 1

Connie M. McCormick
INVENTOR.

BY *Clarence A. O'Brien*
and *Harvey B. Jackson*
Attorneys

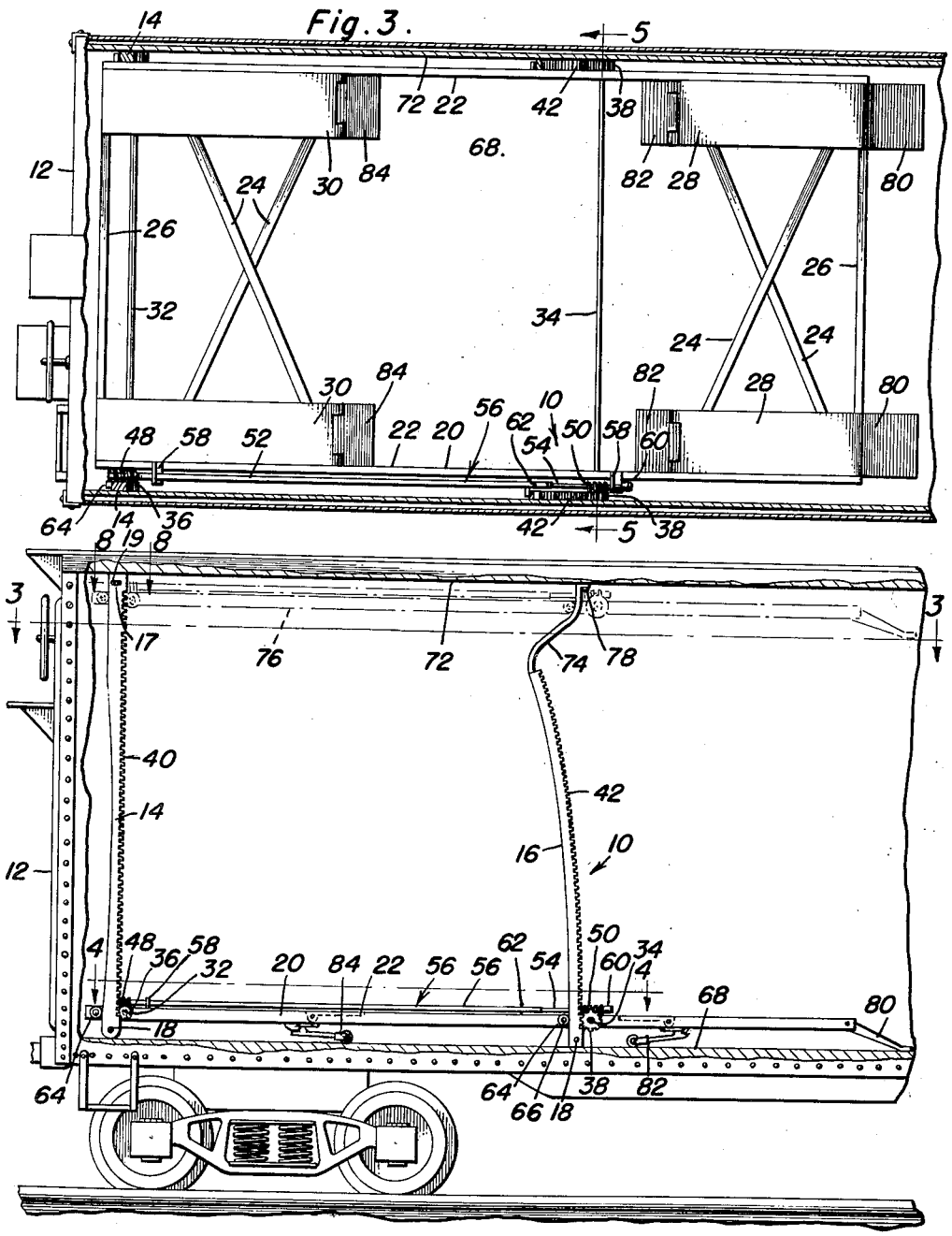

Nov. 11, 1952     C. M. McCORMICK     2,617,368
VEHICLE ELEVATING APPARATUS

Filed Feb. 7, 1949     3 Sheets-Sheet 3

Connie M. McCormick
INVENTOR.

BY *Clarence A. O'Brien*
*and Harvey B. Jacobson*
Attorneys

Patented Nov. 11, 1952

2,617,368

UNITED STATES PATENT OFFICE 2,617,368

VEHICLE ELEVATING APPARATUS

Connie M. McCormick, Hialeah, Fla.

Application February 7, 1949, Serial No. 74,916

8 Claims. (Cl. 105—368)

This invention relates to new and useful improvements and structural refinements in apparatus for elevating vehicles, and in particular the invention concerns itself with an apparatus of this nature, such as may be conveniently and effectively employed for loading automobiles and similar vehicles into railroad freight cars.

The principal object of the invention is to provide an elevating apparatus by means of which one vehicle may be conveniently and expeditiously raised and supported in an elevated position above another vehicle in the freight car, this being so arranged that a minimum amount of space is wasted in the limited capacity of the freight car, but nevertheless, the vehicles are adequately protected against being scratched or otherwise damaged during loading or unloading as well as while in transit.

Bearing in mind that the front end portion of a vehicle is usually of lesser height than the intermediate body portion thereof, an important feature of the invention resides in the provision of means for unevenly elevating a vehicle to an inclined position wherein the front end portion and the intermediate portion thereof are substantially equally spaced from the roof of the freight car, while a second vehicle may be positioned under the elevated vehicle and faced in a relatively opposite direction with respect to the latter, so that the two vehicles may be stacked in the railroad car with the minimum amount of waste space, as aforesaid. The railroad car is, of course, sufficiently long to accommodate four vehicles stacked one above another in two pairs.

Another feature of the invention involves the provision of means for elevating the vehicle receiving frame to a substantially horizontal position immediately adjacent the roof of the railroad car, so that the latter may be conveniently employed in almost its entire capacity for transporting material other than automobiles, this facility being available almost without interference from the vehicle elevating apparatus.

Another feature of the invention resides in the provision of means for automatically locking the vehicle receiving frame in a predetermined position, either partially or fully elevated, these locking means being incidental to the provision of means for raising and lowering the vehicle receiving frame so that special attention need not be given to locking the apparatus so as to prevent accidental or unintentional lowering thereof.

A still further feature of the invention lies in its adaptability for actuation by a portable power source, so that the construction of the apparatus is substantially simplified inasmuch as the power actuating means need not be provided individually in each railroad car wherein the invention is used.

Some of the advantages of the invention lie in its simplicity of construction, convenience of operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 2 is a fragmentary cross sectional view, similar to that shown in Figure 1, but illustrating the vehicle receiving platform in its initial lowered position by full lines, and also indicating the vehicle receiving platform or frame by dotted lines as being elevated to its ultimate position adjacent the freight car roof;

Figure 3 is a fragmentary cross sectional view, taken substantially in the plane of the line 3—3 in Figure 2;

Like characters of reference are employed to designate like parts in the specification and throughout the several views.

Figure 1:
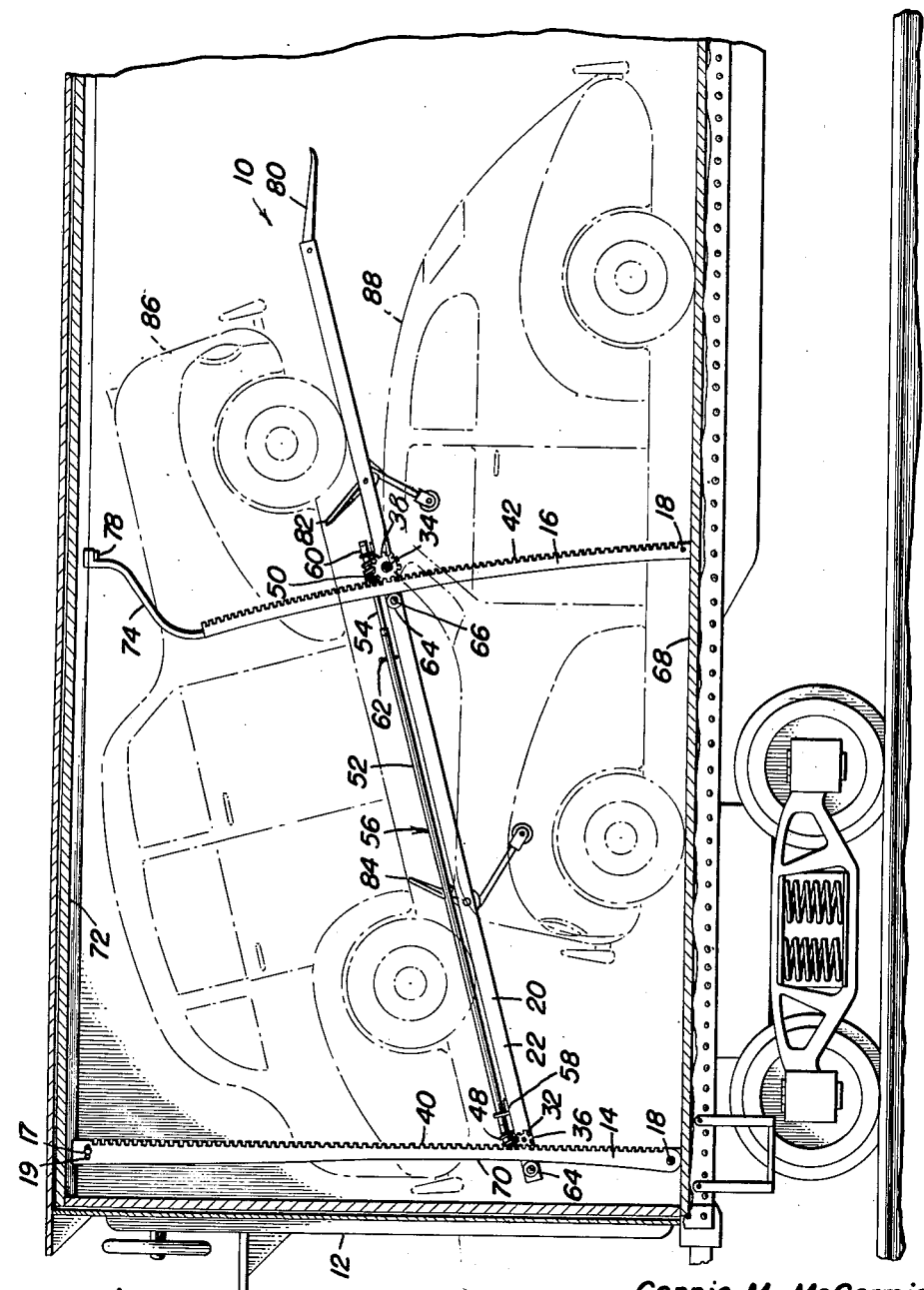
Figure 1 is a fragmentary cross sectional view of a railroad freight car showing the invention in situ therein and illustrating the vehicle receiving frame in its partially elevated, inclined position, together with two vehicles shown in their loaded positions by dotted lines.

Referring now to the accompanying drawings in detail, the invention consists of a vehicle elevating apparatus designated generally by the reference character 10, the same being adapted for use in a railroad freight car 12 of any conventional "automobile" type. It may be noted at this point that this freight car may be provided either with side doors or with end doors, both being in accordance with customary practice.

The apparatus 10 embodies in its construction a pair of transversely spaced guiding and supporting members 14 and a further pair of transversely spaced guiding and supporting members 16, these pairs of guides being referred to as the primary and secondary members, respectively, for purposes of convenient identification. It is to be noted that the members 14, 16 are secured by suitable bolts 17, 18 to the side walls of the freight car 12 at longitudinally spaced locations in the freight car, that is to say, one pair of members may be located adjacent one end wall of the freight car while the remaining pair of members is disposed intermediately the length of the car, substantially as shown. Although only approximately one-half the freight car length is illustrated in the accompanying drawings, it should, of course, be understood that the freight car is sufficiently long to accommodate two separate and distinct devices constructed in accordance with the teachings of the invention. That is to say, the invention is adapted to accommodate two vehicles, while four vehicles may be loaded into the freight car.

The aforementioned bolts 17 extend through suitable horizontal slots 19 provided in the members 14, whereby the latter may be adjusted toward or away from the members 16 within the limits of movement of these bolts in their slots.

An elongated vehicle receiving frame or platform 20 is provided between the pairs of members 14, 16 and is movable upwardly and downwardly therebetween, this being effected in a manner hereinafter more fully described. For the present it may be explained that the frame or platform 20 simply consists of spaced parallel, longitudinally extending channels 22 secured together by diagonally extending cross braces 24 and by transversely extending end pieces 26, the frame 20 also being equipped with four panels or beds 28, 30 on which the vehicle wheels may rest.

It is to be noted that the channels 22 of the frame 20 provide bearings for a pair of transversely extending, rotatable shafts, namely, a primary shaft 32 and a secondary shaft 34. To the end portions of these shafts are secured pairs of primary and secondary pinions 36, 38, respectively, which, in turn, mesh with the primary and secondary toothed racks 40, 42, respectively, with which the respective members 14, 16 are provided. It may be explained at this point that while the "pitch" of the teeth on the various pinions and racks is the same, the primary pinions 36 are substantially smaller in diameter as compared to the relatively larger secondary pinions 38. As a result, assuming the pinions 36, 38 to be rotated at equal speeds, the secondary pinions 38 will travel faster on the racks 42 than the primary pinions 36 will travel on the racks 40, as will be clearly understood.

The shafts 32, 34 also carry suitable worm gears 44, 46, respectively, which are in mesh with respective worms 48, 50 secured to coaxial, telescoped and individually rotatable shaft sections 52, 54 of a drive shaft designated generally by the reference character 56.

This drive shaft 56 is rotatably journaled in suitable brackets 58 provided at one side of the frame 20, the drive shaft extending longitudinally of the frame and being equipped at one end thereof with a driving socket 60 having a polygonal bore (not shown) to receive a complementarily configurated driving member at one end of a flexible shaft rotated by an electric motor. It is to be noted that this flexible shaft, electric motor and polygonal driving member do not constitute a component of the instant invention, since they represent a portable power unit of a conventional design. The power unit as above described is not illustrated in the accompanying drawings, it being sufficient to explain that the power unit is used as required in several freight cars wherein the invention is provided.

Means are provided on the drive shaft 56 to assure synchronized rotation of the shaft sections or portions 52, 54, this means simply assuming the form of a drive pin 62 which may be inserted in registrable apertures formed in the shaft sections 52, 54 to assure their simultaneous rotation.

Suitable guide rollers 64 are rotatably mounted on laterally projecting stub shafts 66 with which the channels 22 of the frame 20 are equipped, the rollers 64 engaging the members 14, 16 and coacting with the pinions 36, 38 in preventing longitudinal shifting of the frame 12 with respect to the members. That is to say, the members 14, 16 are equipped with the toothed racks 40, 42, respectively, at one side, while the rollers 64 engage the members at the relatively opposite side, so that longitudinal shifting of the frame 20 is prevented, as aforesaid.

Figure 7:
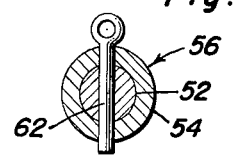
Figure 7 is a cross sectional detail, taken substantially in the plane of the line 7—7 in Figure 4.
Figure 6:
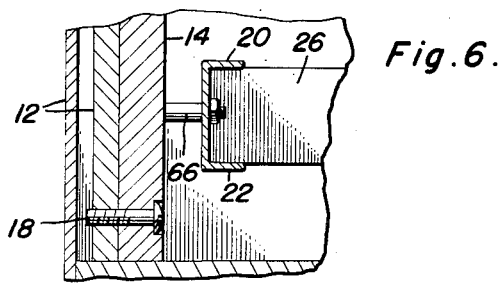
Figure 6 is a fragmentary cross sectional view, taken substantially in the plane of the line 6—6 in Figure 4.

It will be apparent from the foregoing that when the pin 62 is inserted in position to assure simultaneous rotation of the drive shaft sections 52, 54 as shown in Figure 7, and a suitable power unit is employed for rotating the drive shaft 56 through the medium of the socket 60, the pinions 36, 38 will be driven at the same speed, but by virtue of their different diameters, the pinions 38 will travel faster along the racks 42 than the pinions 36 on the racks 40, as has been already explained. As a result, the vehicle receiving frame 20, which in its initial position is disposed adjacent the floor 68 of the car 12 in a substantially horizontal plane, will be unevenly elevated so that it will eventually assume an inclined position intermediately the "height" of the freight car, substantially as shown in Figure 1.

In order to prevent binding between the pinions 36, 38 and the rollers 64 on the members 14, 16, that is, while the frame 20 is raised unevenly, the members 16 together with their racks 42 are arcuated in planes parallel to the sides of the freight car, while the longitudinal edges of the members 14 which are not provided with the racks 40 are concaved, as indicated at 70 in Figure 1. This arrangement is closely computed so as to facilitate freedom of travel of the pinions and rollers on the members without binding, but at the same time, so as to eliminate longitudinal shifting of the frame 20 between the members, as will be clearly apparent.

It is to be noted that the members 16 terminate below the upper ends of the members 14 (the latter reaching substantially to the roof 72 of the freight car 12) and that toothless, reverse-curved slides 74 are provided on the members 16 above the toothed racks 42 of the latter, as is best shown in Figures 1 and 2. The slides 74 are engageable by the rollers 64 disposed adjacent the secondary shaft 34 (see Figures 1, 2 and 3), and matters are so arranged that when the frame 20 is in the position shown in Figure 1 and drive is applied to the shaft 56 so as to raise the frame, the pinions 36, 38 will continue on their upward travel along the racks 40, 42, respectively, until a point is reached where the pinions 38 reach the upper ends of the racks 42, after which the immediately adjacent rollers 64 will engage the slides 74 while the pinions 36 continue upwardly along their travel on the racks 40. As a result, the frame 20 will be subjected to a combined force acting in longitudinal as well as upward directions, and as a result thereof the rollers 64 on the slides 74 will travel upwardly to an ultimate elevated position wherein it is disposed substantially in a horizontal plane immediately adjacent the roof 72 of the freight car 12, as indicated by the phantom lines 76 in Figure 2. This action is, of course, facilitated by the provision and configuration of the slides 74 which facilitate longitudinal shifting of the frame 20 while, at the same time, one end portion of the frame is being propelled upwardly by the engagement of the pinions 36 with the racks 40. It is to be noted that the slides 74 are suitably secured as at 78 to the freight car 12, and it should, of course, be understood that when the frame 20 is lowered from its ultimate position indicated at 76, it will first assume an inclined, partially elevated position as shown in Figure 1, before returning to its initial, horizontal position adjacent the floor 68, as indicated in Figure 2.

In order to facilitate positioning of the vehicle on the panels 28, 30 when the frame 20 is disposed in its initial, lowered position, the panels 28, 30 may be equipped with downwardly extending approaches 80, and combined approach and chock units 82, 84. The units 82, 84 rest on the floor 68 when the frame 20 is fully lowered, but are automatically raised to the positions shown in Figure 1 when the frame 20 is elevated, thus safeguarding against the vehicle rolling off the inclined frame. Needless to say, any suitable means such as chains, or the like (not shown) may be employed for securing the vehicle to the frame 20, in accordance with conventional practice which is prevalent in the general art of transporting vehicles of this nature. The arrangement of the self-raising approaches 82, 84 is similar to that commonly employed on vehicle hoists used in service stations, such as is disclosed, for example, in Patent No. 1,955,586, issued on April 17, 1934.

The purpose of the removable pin 62 in the drive shaft unit 56 is to facilitate independent rotation of the shaft sections 52, 54, such as may facilitate convenient adjustment of the pinions 36, 38 with respect to the racks 40, 42, which adjustment may be necessary in order to assure proper disposition of the frame 20 in its various locations relative to the members 14, 16. That is to say, by removing the pin 62 and rotating the shaft sections 52, 54 with respect one to the other, an adjustment is facilitated to assure proper, free movement of the frame 20 on the members 14, 16. This adjustment is also valuable in instances where the frame 20 with a vehicle thereon has been raised to the partially elevated, inclined position, and it becomes desirable to alter the inclination thereof so as to properly accommodate another vehicle under the same. In such event the shaft sections 52, 54 may be rotated independently to attain the desired inclination of the frame 20, and it will be observed that the bolts 17 in the slots 19 will permit the members 14 to compensate for any variation in their distance from the members 16 while the platform is being adjusted. Needless to say, the bolts 17 should be securely tightened after the adjustment is made, so as to prevent the structure from vibrating or shifting when in transit.

Figure 4:
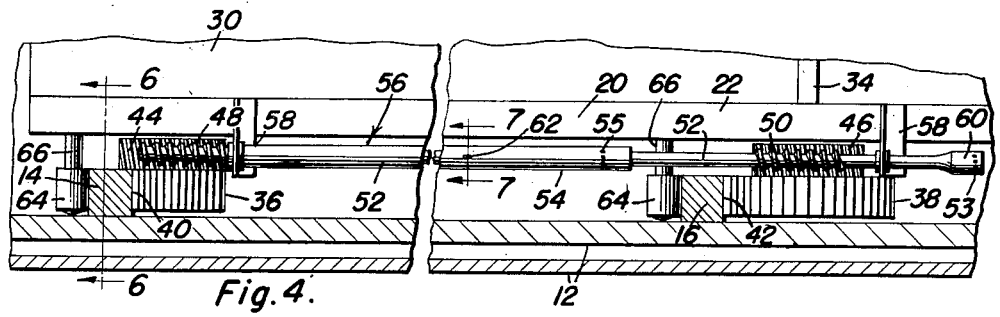
Figure 4 is a fragmentary cross sectional detail, taken substantially in the plane of the line 4—4 in Figure 2.
Figure 5:
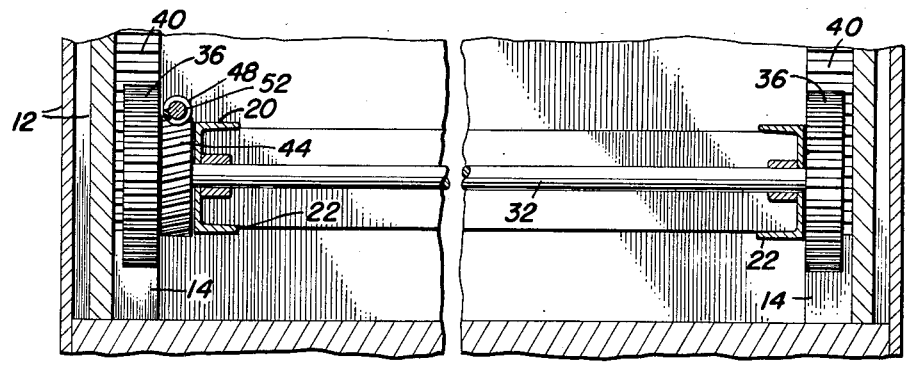
Figure 5 is a cross sectional view, taken substantially in the plane of the line 5—5 in Figure 3.
Figure 8:
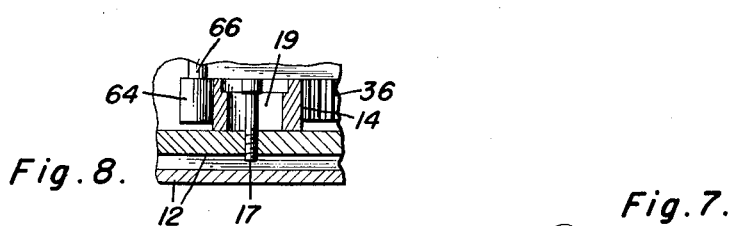
Figure 8 is a fragmentary cross sectional detail, taken substantially in the plane of the line 8—8 in Figure 2.

Sets of apertures 53, 55 may be provided in the shaft sections 52, 54 respectively, to receive a suitable hand bar or wrench when the shaft sections are to be manually rotated to adjust the frame 20. (See Figure 4.)

When the invention is placed in use, the frame or platform 20 is lowered to its initial, horizontal position adjacent the floor 68, and a vehicle is positioned on the platform, after which the platform is elevated to its partially raised, inclined position as shown in Figure 1, while the vehicle is supported by the frame or platform in an inclined position as indicated by the phantom line 83. It is to be noted that in this position the front end portion as well as the intermediate body portion of the vehicle are substantially equally spaced from the roof 72 of the freight car 12, so that a second vehicle, indicated at 88, may be positioned under the frame 20 with the minimum waste of space.

In conclusion it may be explained that while in the accompanying drawings the relatively tall, primary members 14 are illustrated as being disposed adjacent one end of the freight car 12, and the relatively short or low members 16 are illustrated as being positioned intermediate the ends of the freight car, this arrangement is primarily intended for use when the freight car is equipped with side doors, permitting the lower vehicle 88 to be positioned under the frame 20 when the latter, together with the vehicle 86, is elevated as shown. However, in instances where the freight car is equipped with end doors, the disposition of the members 14, 16 may be reversed, so that the lower vehicle 88 may still be positioned under the upper vehicle 86 after the latter is installed in its elevated location. It will be apparent that in the absence of such alternate arrangement, the arrangement of the members 14, 16 as illustrated in the accompanying drawings would permit only one vehicle to be positioned (through end doors) under two elevated vehicles, which disadvantage is, of course, eliminated by either employing freight cars with side doors, or alternatively, by reversing the disposition of the members 14, 16, as aforesaid.

It may be added that the worm gearing 44, 48 and 46, 50 is of a "non-reversible" type, wherein drive may be imparted by the worms to the worm gears but not vice versa. Accordingly, a self-locking action is obtained, whereby the vehicle supporting frame 20 is safely and automatically retained in any desired position on the members 14, 16.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangements of parts may be resorted to without departing from the spirit and scope of the invention as claimed.

Having described the invention, what is claimed as new is:

1. In a railroad car for transporting automobiles and like vehicles, a vehicle elevating apparatus comprising a pair of transversely spaced primary guiding and supporting members and a pair of transversely spaced secondary guiding and supporting members secured in the railroad car at longitudinally spaced locations and extending substantially from the railroad car floor to the roof, said secondary members being arcuate in planes parallel to the sides of the car and said primary members having concave edges at sides opposed from the secondary members, an elongated vehicle receiving frame positioned between and movable upwardly and downwardly on said members; said frame in its initial position resting on the railroad car floor in a substantially horizontal plane, racks having evenly spaced teeth provided on said members, a pair of relatively small primary pinions and a pair of relatively large secondary pinions provided on said frame and having evenly spaced teeth engaging said racks on the primary and secondary members respectively, means for sustaining said pinions in engagement with said racks, and means for rotating said pinions at equal speeds whereby said frame may be raised unevenly on said pairs of members to an inclined elevated position above the railroad car floor.

2. In a railroad car for transporting automobiles and like vehicles, a vehicle elevating apparatus comprising a pair of transversely spaced primary guiding and supporting members and a pair of transversely spaced secondary guiding and supporting members secured in the railroad car at longitudinally spaced locations and extending substantially from the car floor to the roof, said secondary members being arcuate in planes parallel to the sides of the car and said primary members having concave edges at the sides opposed from the secondary members, an elongated vehicle receiving frame positioned between and movable upwardly and downwardly on said members, said frame in its initial position resting on the railroad car floor in a substantially horizontal plane, racks having evenly spaced teeth provided on said members, a pair of relatively small primary pinions provided on said frame and engaging the racks on said primary members, a pair of relatively large secondary pinions provided on said frame at longitudinally spaced points from said primary pinions and engaging the racks on said secondary members, means for sustaining said pinions in engagement with said racks, and means for simultaneously rotating said pinions at a uniform speed whereby the portion of said frame between said secondary members may be raised at a faster rate than the portion thereof between said primary members so as to elevate said frame to an inclined position above the railroad car floor.

3. The device as defined in claim 2, wherein the racks on said secondary members terminate below the upper ends of the racks on said primary members, together with toothless slides provided on said secondary members above the racks of the latter, said slides being reverse-curved and extending upwardly and away from the primary members whereby said frame may be guided by said slides during upward movement of said primary pinions to an ultimate position on the racks of said primary members, and whereby said frame may be elevated by the upward movement of the primary pinions from its inclined position to a substantially horizontal ultimate position adjacent the railroad car roof.

4. The device as defined in claim 2, wherein the said means for rotating said pinions includes means for automatically locking said frame in a predetermined position relative to said members.

5. The device as defined in claim 2, wherein said means for sustaining said pinions in engagement with said racks comprise guiding rollers provided on said frame and engaging said members.

6. The device as defined in claim 2, wherein said last mentioned means include primary and secondary shafts rotatably journaled in said frame and carrying the respective primary and secondary pinions, together with means operatively connecting said shafts together.

7. The device as defined in claim 6, wherein said means for connecting said shafts together include worm gears secured to said primary and secondary shafts, a drive shaft rotatably mounted on said frame, and worms secured to said drive shaft and meshing with said worm gears.

8. The device as defined in claim 7, wherein said drive shaft includes a pair of telescopic coaxial and independently rotatable shaft sections each operatively connected to one of said shafts, and disconnectable means for locking said shaft sections together for simultaneous rotation, whereby said shaft sections may be independently rotated upon disconnection of said last mentioned means.

CONNIE M. McCORMICK.

REFERENCES CITED

The following references are of record in the file of this patent:

UNITED STATES PATENTS

| Number | Name | Date |
|---|---|---|
| 764,141 | Miller | July 5, 1904 |
| 1,894,534 | Dolan | Jan. 17, 1933 |
| 2,007,514 | Wilson et al. | July 9, 1935 |
| 2,062,243 | Williams | Nov. 24, 1936 |
| 2,233,055 | Kennedy | Feb. 25, 1941 |